(12) United States Patent
Mashiki

(10) Patent No.: US 6,519,934 B2  
(45) Date of Patent: Feb. 18, 2003

(54) EMISSION CONTROL METHOD AND APPARATUS OF AN INTERNAL COMBUSTION ENGINE

(75) Inventor: Zenichiro Mashiki, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/880,879

(22) Filed: Jun. 15, 2001

(65) Prior Publication Data

US 2001/0054284 A1 Dec. 27, 2001

(30) Foreign Application Priority Data

Jun. 26, 2000 (JP) ......................................... 2000-191215

(51) Int. Cl.[7] ................................................. F01N 3/00
(52) U.S. Cl. ............................. 60/285; 60/274; 60/286; 60/297
(58) Field of Search .......................... 60/274, 285, 286, 60/295, 297, 301

(56) References Cited

U.S. PATENT DOCUMENTS

| | | | |
|---|---|---|---|
| 5,970,707 A | * 10/1999 | Sawada et al. | 60/277 |
| 6,109,024 A | * 8/2000 | Kinugasa et al. | 60/285 |
| 6,138,453 A | * 10/2000 | Sawada et al. | 60/277 |
| 6,195,987 B1 | * 3/2001 | Miyashita | 60/285 |
| 6,269,791 B1 | * 8/2001 | Tanaka et al. | 123/300 |

FOREIGN PATENT DOCUMENTS

| | | |
|---|---|---|
| JP | A 7-139340 | 5/1995 |
| JP | A 11-117791 | 4/1999 |
| JP | A 11-141370 | 5/1999 |

* cited by examiner

Primary Examiner—Thomas Denion  
Assistant Examiner—Binh Tran  
(74) Attorney, Agent, or Firm—Oliff & Berridge, PLC

(57) ABSTRACT

A method and apparatus control an emission of an internal combustion engine. The emission control of the internal combustion engine has a three-way catalyst and a NOx storage-reduction catalyst in an exhaust passage. The emission control reduces NOx stored in the catalyst to recover its NOx storing capability by performing a rich spike control during a lean burn operation. The emission control apparatus has an electronic control unit that limits the execution time of the rich spike control and, after the elapse of the limited execution time, performs a stoichiometric burn operation. The emission control prevents prolongation of the rich spike control and thereby prevents deterioration of HC and CO emissions. By performing the stoichiometric burn operation after the elapse of the limited time of the rich spike control, the emission control apparatus recovers the NOx storing capability while avoiding deterioration of HC and CO emissions.

22 Claims, 3 Drawing Sheets

EMISSION CONTROL METHOD AND APPARATUS OF AN INTERNAL COMBUSTION ENGINE

INCORPORATION BY REFERENCE

The disclosure of Japanese Patent Application No. 2000-191215 filed on Jun. 26, 2000 including the specification, drawings and abstract is incorporated herein by reference in its entirety.

BACKGROUND OF THE INVENTION

1. Field of Invention

The present invention relates to an emission control method and apparatus of an internal combustion engine that controls emissions via a NOx storage device provided in an exhaust passage of the engine.

2. Description of Related Art

Direct injection type internal combustion engines are conventionally known in which the combustion mode is changed between a lean burn mode in which the engine air-fuel ratio is set to a fuel-lean side of the stoichiometric air-fuel ratio and a stoichiometric burn mode in which the engine air-fuel ratio is set to the stoichiometric air-fuel ratio. For example, according to an art disclosed in Japanese Patent Application Laid-Open No. 7-139340, NOx produced during a lean burn operation of an internal combustion engine is absorbed and stored into a NOx storage-reduction catalyst and, when the amount of NOx stored in the NOx storage-reduction catalyst reaches or exceeds an allowable value, a rich spike control of temporarily setting the engine air-fuel ratio to a fuel-rich ratio is performed. Due to the rich spike control, NOx stored in the NOx storage-reduction catalyst is reduced, so that NOx emission deterioration is prevented.

However, the aforementioned art becomes unable to efficiently reduce NOx by the rich spike control when the amount of exhaust gas becomes great and, therefore, the amount of exhaust gas flowing through the NOx storage-reduction catalyst also becomes great, for example, during high-speed engine operation or the like. If in this situation, a sufficient recovery of the NOx storing capability of the NOx storage-reduction catalyst is attempted, the rich spike control is performed for a long time, resulting in deteriorated HC and CO emissions.

To avoid this problem, it is conceivable to limit the execution time of the rich spike control (rich spike duration Tr) as indicated in FIG. 4. However, limitation of the rich spike duration Tr results in insufficient recovery of the NOx storing capability of the NOx storage-reduction catalyst, that is, a state in which the amount of NOx stored in the NOx storage-reduction catalyst is not "0", when the lean burn operation is resumed. As a result, the amount of NOx that passes through the NOx storage-reduction catalyst during the lean burn operation increases, thus giving rise to a problem of NOx emission deterioration.

SUMMARY OF THE INVENTION

It is an object of the invention to provide an internal combustion engine emission control method and apparatus capable of curbing deterioration of NOx emission while avoiding deterioration of HC and CO emissions even when the amount of exhaust gas becomes great, for example, during a high-speed engine operation or the like.

An emission control method and apparatus of an internal combustion engine in accordance with a first aspect of the invention includes a storage device (or NOx storage-reduction catalyst) provided in an exhaust passage of the internal combustion engine that stores a threshold level of NOx, and reduces NOx stored in the storage device to recover a NOx storing level of the storage device by performing a rich spike control of temporarily shifting an engine air-fuel ratio to a fuel-rich ratio during a lean burn operation of the internal combustion engine. The emission control method and apparatus limits an execution time of the rich spike control, and performs a stoichiometric burn operation in which the engine air-fuel ratio is stoichiometric, after the limited execution time elapses.

In accordance with the aforementioned aspect, limitation of the execution time of the rich spike control prevents deterioration of emissions of hydrocarbons (HC) and CO (carbon monoxide) caused by prolonged rich spike control. Furthermore, since the stoichiometric burn operation is performed after the elapse of the limited execution time of the rich spike control, it is possible to recover the NOx storing level of the storage device while avoiding deterioration of HC and CO emissions owing to the emission control effect of the storage device during the stoichiometric burn operation. The recovery is, in other words, reduction of NOx remaining in the storage device at the end of the rich spike control accomplished by reducers contained in exhaust gas during the stoichiometric burn operation, such as HC, CO, etc. Therefore, it becomes possible to curb deterioration of NOx emission while avoiding deterioration of HC and CO emissions even when the amount of exhaust gas becomes great, for example, during a high-speed engine operation or the like.

In the aforementioned aspect, the exhaust passage may be provided with a three-way catalyst.

Therefore, since the exhaust passage is provided with the three-way catalyst and the storage device, the emission control effect of the three-way catalyst is added to the emission control effect of the storage device during the stoichiometric burn operation. Due to the emission control effects of the two catalysts, deterioration of HC and CO emissions can be more efficiently prevented. Hence, the NOx storing level can be recovered while deterioration of HC and CO emissions is more effectively avoided.

In the aforementioned aspect, the control may switch to the stoichiometric burn operation when the limited execution time of the rich spike control elapses without the NOx storing level having been recovered.

Therefore, the amount of NOx remaining in the storage device at the end of the rich spike control can be reduced during the stoichiometric burn operation while deterioration of the HC and CO emissions is avoided, owing to the emission control effect of the storage device or the emission control effects of the storage device and the three-way catalyst during the stoichiometric burn operation. Hence, the NOx storing level of the storage device can be sufficiently recovered before the lean burn operation is resumed.

In the aforementioned aspect, the control may switch from the stoichiometric burn operation to the lean burn operation after the NOx storing level is recovered.

Therefore, when the operation is switched from the stoichiometric burn operation to the lean burn operation, the NOx storing level has been recovered. Therefore, deterioration of NOx emission can be further curbed. Furthermore, the time before the next execution of the rich spike control, that is, the interval of execution of the rich spike control, can be increased in comparison with the conventional art, and deterioration of HC and CO emissions can be correspondingly curbed.

In the aforementioned aspect, the control may perform the stoichiometric burn operation for a pre-set period of time, and may switch to the lean burn operation after performing the stoichiometric burn operation.

Therefore, by performing the stoichiometric burn operation for a pre-set period of time, for example, a time that is sufficient for the stoichiometric burn operation to recover the NOx storing level, the NOx storing level can be recovered before the operation is switched to the lean burn operation. Hence, deterioration of NOx emission can be further curbed, and the interval of execution of the rich spike control can be increased from the conventional interval, so that, correspondingly, deterioration of HC and CO emissions can be further curbed.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A preferred embodiment of the invention will be described hereinafter with reference to FIGS. 1 to 3.

Figure 1:
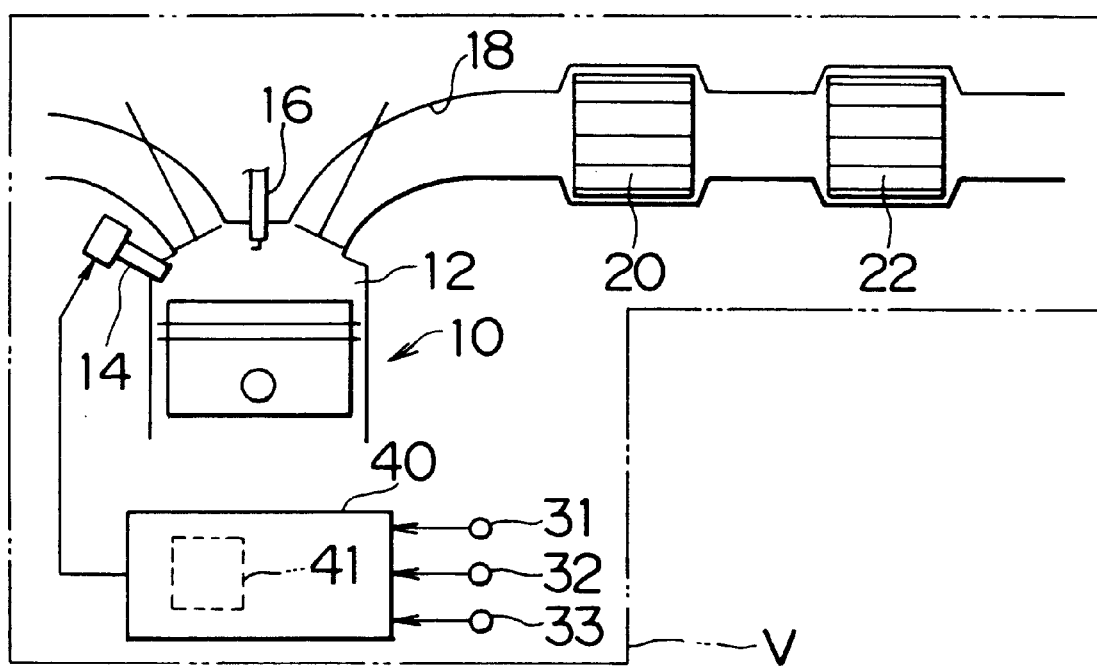
FIG. 1 is a schematic diagram illustrating a construction of an emission control apparatus of a vehicle-installed internal combustion engine in accordance with an embodiment of the invention.

FIG. 1 schematically illustrates a construction of an emission control apparatus in accordance with the embodiment and a construction of an engine 10 to which the emission control method and apparatus is applied.

As shown in FIG. 1, the engine 10 installed in a vehicle (V) has an injector 14 for directly injecting fuel into a combustion chamber 12, and an ignition plug 16 for igniting fuel injected from the injector 14. In the engine 10 of this embodiment, the form of combustion is changed among stratified charge burn (lean burn), stoichiometric burn, and rich burn by changing the fuel injection mode of the injector 14.

For example, for the stratified charge burn, the fuel injection timing is set to a later period in the compression stroke. At the time of ignition, therefore, only a mixture near the ignition plug 16 is in a partially ignitable fuel-rich state. An average engine air-fuel ratio (A/F) of the air-fuel mixture is set to a ratio on the fuel-lean side (e.g., A/F=25 to 50) of the stoichiometric air-fuel ratio (A/F=14.5). For the stoichiometric burn, the fuel injection timing is set to a timing in the intake stroke. Therefore, the engine air-fuel ratio (hereinafter, simply referred to as "air-fuel ratio") in the combustion chamber 12 at the time of ignition becomes substantially uniform. The air-fuel ratio is set in the proximity of the stoichiometric air-fuel ratio.

The changing of combustion form between the stratified charge burn and the stoichiometric burn is performed based on a state of operation of the engine 10, such as the engine load, the engine revolution speed, etc. The combustion form is set to the stratified charge burn in a low-load and low-speed region, and is set to the stoichiometric burn in a high-load and high-speed region.

For the rich burn, the fuel injection timing is set to a timing in the intake stroke, as in the case of the stoichiometric burn. However, the amount of fuel injected is increased from the level set during the stoichiometric burn. Therefore, the air-fuel ratio is set to a ratio on the fuel-rich side (A/F=11 to 13) of the stoichiometric air-fuel ratio.

An exhaust passage 18 connected to the combustion chamber 12 is provided with a three-way catalyst 20, and a NOx storage-reduction catalyst 22 disposed downstream of the three-way catalyst 20. The three-way catalyst 20 and the NOx storage-reduction catalyst 22 combined substantially remove HC (hydrocarbon), CO (carbon monoxide), and NOx (oxides of nitrogen) from exhaust gas.

That is, on the three-way catalyst 20, HC, CO and NOx are simultaneously removed from exhaust gas by oxidation-reduction reactions. The NOx storage-reduction catalyst 22 temporarily absorbs and stores NOx from exhaust gas discharged during the stratified charge burn. During the rich burn or the stoichiometric burn, the NOx storage-reduction catalyst causes stored NOx to be reduced by HC, CO and the like in exhaust gas serving as reducers.

The vehicle (V) has a revolution speed sensor 31 for detecting the engine revolution speed, an accelerator sensor 32 for detecting the amount of depression of an accelerator pedal (not shown), and a vehicle speed sensor 33 for detecting the travel speed of the vehicle (V) (vehicle speed SPD). Detection signals from the sensors 31 to 33 are inputted to an electronic control unit 40 that performs various controls of the engine 10.

The electronic control unit 40 performs various controls, including a fuel injection control and the like, based on the state of operation of the engine 10 and the state of running of the vehicle detected by the sensors 31 to 33 and the like. The electronic control unit 40 has a memory 41 that stores programs and arithmetic operation maps for execution of various controls, and that stores various data calculated at the time of execution of a control.

The emission control apparatus of the embodiment having the above-described construction, when it is determined during the stratified charge burn operation that the NOx storing capability of the NOx storage-reduction catalyst 22 is insufficient, performs a NOx storing capability recovering process (rich spike control) of recovering the NOx storing capability and, after the recovery, resuming the stratified charge burn operation.

The NOx storing capability recovering process will be described in detail with reference to FIGS. 2 and 3.

Figure 2:
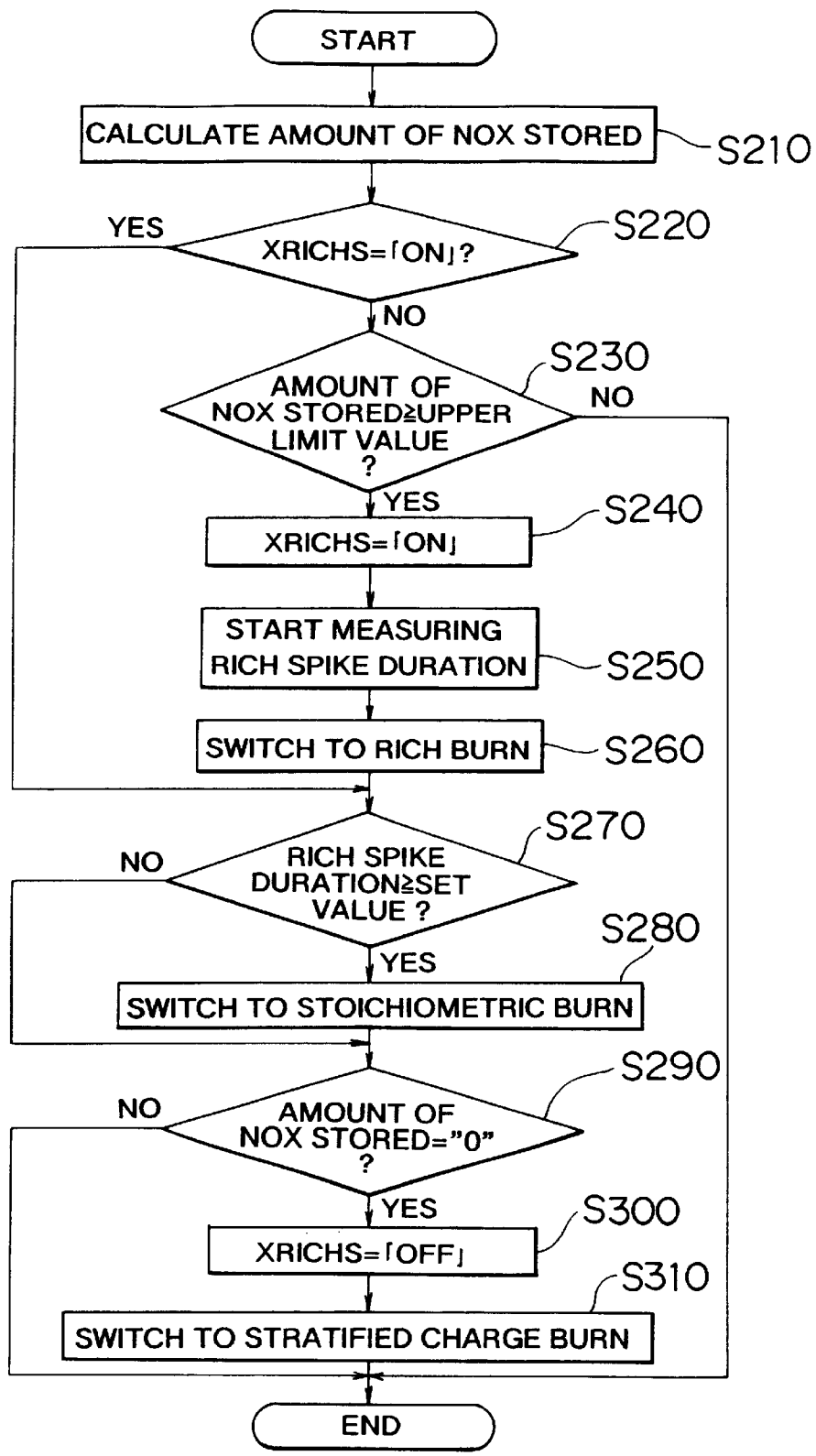
FIG. 2 is a flowchart illustrating a procedure of a NOx storing capability recovering process in accordance with the embodiment of the invention.
Figure 3:
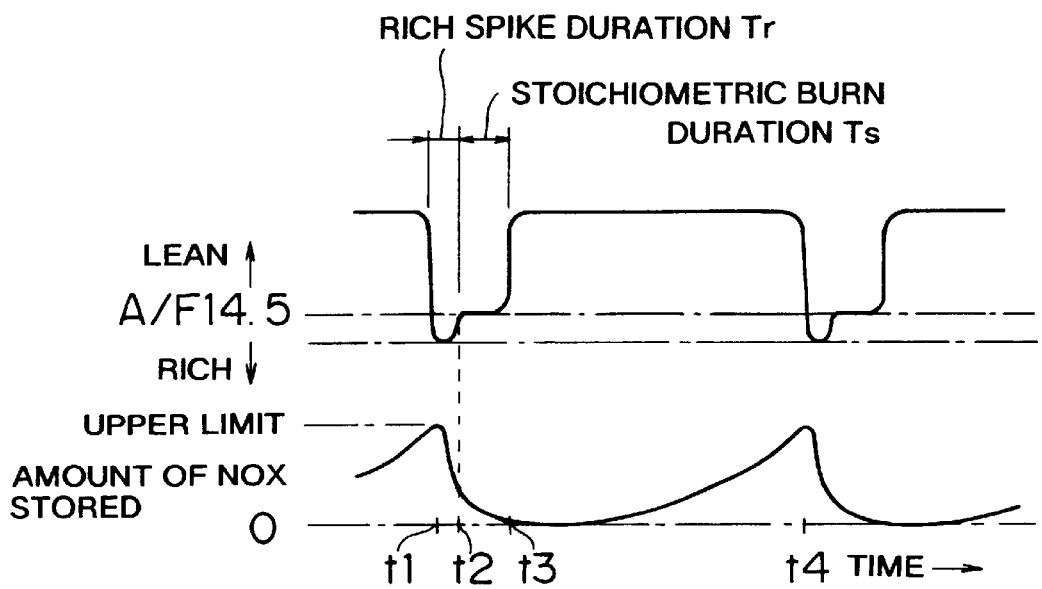
FIG. 3 is a timing chart illustrating operations of the embodiment of the invention.

FIG. 2 is a flowchart illustrating a processing procedure of the NOx storing capability recovering process. The series of steps illustrated in the flowchart is executed as an interrupt of a predetermined time period by the electronic control unit 40.

In the NOx storing capability recovering process, the electronic control unit 40 first calculates in step S210 the amount of NOx stored in the NOx storage-reduction catalyst 22. The amount of NOx stored is determined from a NOx counter value CNOX. During the stratified charge burn operation, the amount of NOx contained in exhaust gas is great, and therefore the NOx counter value CNOX is incremented by a predetermined value set based on the state of engine operation during the stratified charge burn operation. Thus, the NOx counter value CNOX during the stratified charge burn operation indicates the amount of NOx stored. During each of the rich burn operation and the stoichiometric burn operation, NOx stored in the NOx storage-reduction catalyst 22 is reduced by reducers contained in exhaust gas, such as HC, CO, etc, and therefore the NOx counter value CNOX is decremented by a predetermined value set in accordance with the state of engine operation during the rich or stoichiometric burn operation.

After calculating the amount of NOx stored, the electronic control unit 40 proceeds to step S220, in which the electronic control unit 40 determines whether a rich spike control flag XRICHS has been set to an "on" status. If the rich spike control flag XRICHS has been set to the "on" status, the electronic control unit 40 goes to step S270, in which the electronic control unit 40 determines whether the rich spike duration Tr is greater than or equal to a predetermined value.

Conversely, if the rich spike control flag XRICHS has not been set to the "on" status (NO at step S220), the process proceeds to step S230, in which the electronic control unit 40 determines whether the amount of NOx stored is greater than or equal to an upper limit value. If the amount of NOx stored is less than the upper limit value (NO at step S230), the electronic control unit 40 temporarily ends the process illustrated in FIG. 2. In this case, the NOx storing capability is not insufficient, and therefore the stratified charge burn operation is continued.

Conversely, if it is determined in step S230 that the amount of NOx stored is at least the upper limit value (YES at step S230), the process proceeds to step S240, in which the electronic control unit 40 sets the rich spike control flag XRICHS to the "on" status. Since it has been determined that NOx storing capability is insufficient, the rich spike control flag XRICHS is thus set to perform the rich spike control for reducing NOx stored in the NOx storage-reduction catalyst 22.

After that, the electronic control unit 40 starts measuring the rich spike duration Tr in step S250. Subsequently in step S260, the unit 40 starts the rich spike control. Thus, the rich burn operation is entered.

Subsequently in step S270, the electronic control unit 40 determines whether the rich spike duration Tr is at least a set value. At this moment, the rich spike control has just started, and the rich spike duration Tr is less than the set value. Therefore, the unit 40 proceeds to step S290, in which the unit 40 determines whether the amount of NOx stored has become "0".

If the amount of NOx stored is not "0" (NO at step S290), the unit 40 temporarily ends the process illustrated in FIG. 2. In that case, the NOx storing capability of the NOx storage-reduction catalyst 22 has not been recovered, and therefore the rich burn operation is continued.

After that, if the electronic control unit 40 determines in step S220 that the rich spike control flag XRICHS has been set to the "on" status (YES at step S210), the unit 40 proceeds to step S270. If the unit 40 determines that a predetermined time corresponding to the set value has elapsed following the start of the rich spike control, that is, the rich spike duration Tr has become greater than or equal to the set value (YES at step S270), the process proceeds to S280. In step S280, the unit 40 stops the rich spike control and enters the stoichiometric burn operation. Thus, step S270 limits the execution time of the rich spike control to the aforementioned predetermined time.

If the NOx storing capability of the NOx storage-reduction catalyst 22 is not recovered within the limited execution time of the rich spike control, that is, the amount of NOx stored has not become "0" (NO at step S290), the electronic control unit 40 enters the stoichiometric burn operation from the rich spike control in step S280.

The amount of NOx reduced by the predetermined time of execution of the rich spike control starting at the time of the amount of NOx stored reaching the upper limit value (the amount B of NOx reduced by the rich spike control) is a value obtained by subtracting the NOx counter value CNOX occurring at the elapse of the predetermined time from the upper limit value. The NOx counter value CNOX at the elapse of the predetermined time represents the remaining amount C of NOx stored in the NOx storage-reduction catalyst 22.

After that, if it is determined that, due to continued stoichiometric burn operation, the amount A of NOx reduced by the stoichiometric burn operation equals the remaining amount C of NOx stored and therefore the amount of NOx stored has become "0" (YES at step S290), the process proceeds to step S300, in which the electronic control unit 40 sets the rich spike control flag XRICHS to an "off" status. That is, since due to the stoichiometric burn operation, the amount of NOx stored has become "0" and the NOx storing capability of the NOx storage-reduction catalyst 22 has been sufficiently recovered, the rich spike control flag XRICHS is thus set to end the stoichiometric burn operation.

Subsequently in step S310, the electronic control unit 40 switches from the stoichiometric burn operation to the stratified charge burn operation.

The aforementioned operation will be further described with reference to the timing chart shown in FIG. 3.

During the stratified charge burn operation, the amount of NOx stored reaches the upper limit value (timing t1), the rich spike control is started. The rich spike a control is executed only for the limited rich spike duration Tr from the timing t1 to t2. Since the execution time of the rich spike control is limited to the predetermined time Tr, a portion of the amount of NOx stored in the NOx storage-reduction catalyst 22 is reduced.

If the rich spike duration Tr becomes equal to the predetermined time corresponding to the set value (timing t2) before the rich spike control sufficiently recovers the NOx storing capability, that is, before the amount of NOx stored becomes "0", the electronic control unit 40 ends the rich spike control and enters the stoichiometric burn operation. During the stoichiometric burn operation, the remaining amount C of NOx not reduced during the rich spike control, but remaining in the NOx storage-reduction catalyst 22, is completely reduced, that is, when the amount of NOx stored becomes "0" (timing t3), the unit 40 switches from the stoichiometric burn operation to the stratified charge burn operation.

After that, when the amount of NOx stored reaches the upper limit value (timing t4) during the stratified charge burn operation, the rich spike control is started again.

The above-described embodiment achieves the following advantages.

(1) Since the execution time of the rich spike control (rich spike duration Tr) is limited, the embodiment prevents deteriorated emissions of HC (hydrocarbon) and CO (carbon monoxide) caused by prolonged rich spike control. Furthermore, since the stoichiometric burn operation is performed after the execution time of the rich spike control, good recovery of the NOx storing capability of the NOx storage-reduction catalyst 22 can be achieved while deterioration of emissions of HC and CO is avoided due to the emission control effects of the three-way catalyst 20 and the NOx storage-reduction catalyst 22 during the stoichiometric burn operation. That is, the amount of NOx remaining in the NOx storage-reduction catalyst 22 at the end of the rich spike control is reduced by reducers contained in exhaust gas during the stoichiometric burn operation, such as HC, CO, etc., so that the NOx storing capability is sufficiently recovered, while deterioration of HC and CO emissions is prevented owing to the emission control effects of the catalysts 20, 22. Therefore, the embodiment is able to substantially prevent NOx emission deterioration while avoiding HC and CO emission deterioration, even when the amount of exhaust gas is great, for example, when the engine revolution speed is high.

(2) The rich spike control is performed when it is determined that the NOx storing capability is insufficient, that is, when the amount of NOx stored reaches or exceeds the upper limit value. Therefore, every time the NOx storing capability becomes insufficient, the NOx storing capability can be sufficiently recovered while deterioration of HC and CO emissions is avoided.

Figure 4:
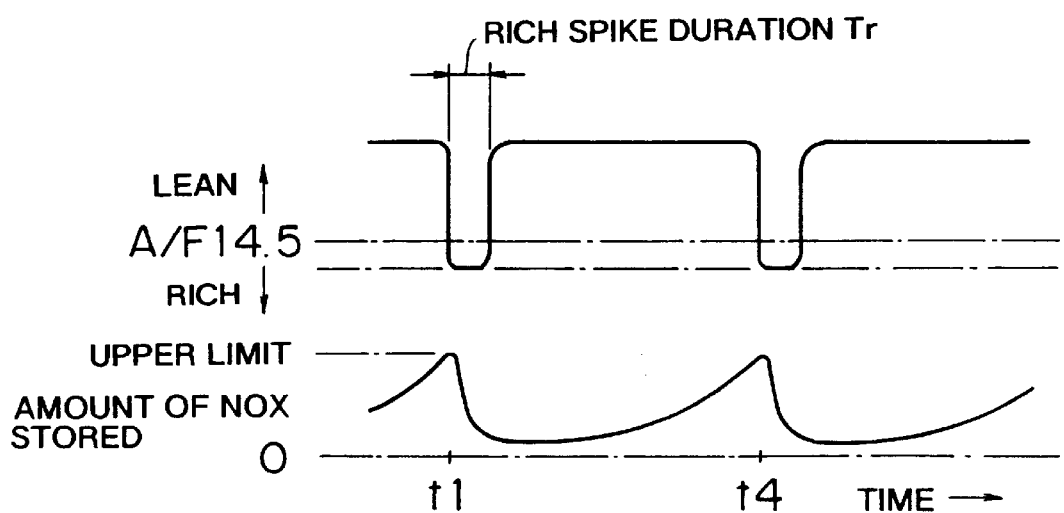
FIG. 4 is a timing chart illustrating operations of a conventional art.

(3) In the conventional art illustrated in FIG. 4, the stratified charge burn operation is entered before the NOx storing capability is sufficiently recovered, that is, before the amount of NOx stored becomes "0." In contrast, in the embodiment, the NOx storing capability has been recovered (the amount of NOx stored has become "0") when the form of combustion is switched from the stoichiometric burn operation to the stratified charge burn operation. Therefore, deterioration of NOx emission can be further curbed, and the interval of execution of the rich spike control (the time from t1 to t4) can be made longer than the conventional interval of execution of the control, so that deterioration of HC and CO emissions can be correspondingly curbed.

(4) Since the three-way catalyst 20 is disposed upstream of the NOx storage-reduction catalyst 22 in the exhaust passage 18, the catalyst temperature of the three-way catalyst 20 becomes higher and the HC and CO removing capability of the three-way catalyst 20 improves. Furthermore, the reduction of NOx stored in the NOx storage-reduction catalyst 22 during the rich spike control can be efficiently conducted.

The above-described embodiment may be carried out with modifications as follows.

Although in the foregoing embodiment, the three-way catalyst 20 and the NOx storage-reduction catalyst 22 are provided in the exhaust passage 18, it is also practicable to adopt a construction in which only the NOx storage-reduction catalyst 22 is provided in the exhaust passage 18. In this construction, deterioration of HC and CO emissions can be avoided by the emission control effect of the NOx storage-reduction catalyst during the stoichiometric burn operation.

According to the foregoing embodiment, when the amount of NOx stored reaches or exceeds the upper limit value, it is determined that the NOx storing capability is insufficient, and the rich spike control is performed. However, the threshold for the determination is not limited to the aforementioned upper limit value, but may also be set to an arbitrary value that is smaller than the upper limit value.

According to the foregoing embodiment, when the amount of NOx stored becomes "0", it is determined that the NOx storing capability has been recovered. It is also practicable to adopt a construction wherein the execution time of the stoichiometric burn operation is pre-set to a sufficiently long time for the stoichiometric burn operation to recover the NOx storing capability, and wherein when the stoichiometric burn operation has been performed for the pre-set execution time, it is determined that the NOx storing capability has been recovered.

Although in the foregoing embodiment, the stoichiometric burn operation is performed after the rich spike control, it is also practicable to perform the stoichiometric burn operation before the rich spike control of a limited execution time. That is, if it is determined that the NOx storing capability of the NOx storage-reduction catalyst 22 is insufficient, the form of combustion is switched from the stratified charge burn operation to the stoichiometric burn operation. After the stoichiometric burn operation is performed for the pre-set time, the rich spike control is performed for a limited execution time. This construction also curbs deterioration of NOx emission while avoiding deterioration of HC and CO emissions.

In the embodiment, the rich spike control is started when it is determined during the stratified charge burn operation that the NOx storing capability of the NOx storage-reduction catalyst 22 is insufficient. However, it is also practical to switch from the stratified charge burn operation to the rich spike control at every elapse of a pre-set time.

In the embodiment, it is assumed that the emission control method and apparatus is applied to the generally-termed direct fuel injection type engine 10 in which fuel is injected directly into the combustion chamber 12 from the injector 14. However, the invention is also applicable to an intake port fuel injection type engine in which fuel is injected into an intake port.

In the illustrated embodiment, the controller (the ECU 40) is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or.MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An emission control apparatus of an internal combustion engine, comprising:
    a storage device provided in an exhaust passage of the internal combustion engine that stores a threshold level of NOx; and
    a controller that reduces NOx stored in the storage device to recover a NOx storing level of the storage device by performing a rich spike control by temporarily shifting an engine air-fuel ratio to a fuel-rich ratio during a lean burn operation of the internal combustion engine,
    wherein the controller limits an execution time of the rich spike control, and performs a stoichiometric burn operation in which the engine air-fuel ratio is stoichiometric, after the execution time limited by the controller elapses.

2. An emission control apparatus according to claim 1, wherein a three-way catalyst is provided in the exhaust passage.

3. An emission control apparatus according to claim 1, wherein the controller switches to the stoichiometric burn operation when the limited execution time of the rich spike control elapses without recovering the NOx storing level.

4. An emission control apparatus according to claim 1, wherein the controller switches from the stoichiometric burn operation to the lean burn operation after the NOx storing level is recovered.

5. An emission control apparatus according to claim 1, wherein the controller performs the stoichiometric burn operation for a pre-set period of time, and switches to the lean burn operation after performing the stoichiometric burn operation.

6. An emission control apparatus according to claim 1, wherein the storage device is a NOx storage-reduction catalyst.

7. An emission control apparatus of an internal combustion engine, comprising:
    a storage device provided in an exhaust passage of the internal combustion engine that stores a threshold level of NOx; and
    a controller that reduces NOx stored in the storage device to recover a NOx storing level of the storage device by performing a rich spike control by temporarily shifting an engine air-fuel ratio to a fuel-rich ratio during a lean burn operation of the internal combustion engine,
    wherein when the controller determines that the NOx storing level has not been recovered, the controller switches from the lean burn operation to a stoichiometric burn operation to reduce a partial amount of NOx stored in the storage device, and after performing the stoichiometric burn operation, the controller performs the rich spike control within a pre-set period of time to reduce a remaining amount of NOx stored in the storage device.

8. An emission control apparatus according to claim 7, wherein a three-way catalyst is provided in the exhaust passage.

9. An emission control apparatus according to claim 7, wherein upon performing the stoichiometric burn operation for a pre-set period of time, the controller starts the rich spike control from the stoichiometric burn operation.

10. An emission control apparatus according to claim 7, wherein after the NOx storing level is recovered, the controller switches from the rich spike control to the lean burn operation.

11. An emission control apparatus according to claim 7, wherein the storage device is a NOx storage-reduction catalyst.

12. A method for controlling an emission of an internal combustion engine, comprising:
    providing a storage device in an exhaust passage of the internal combustion engine that stores a threshold level of NOx;
    reducing NOx stored in the storage device to recover a NOx storing level of the storage device by performing a rich spike control by temporarily shifting an engine air-fuel ratio to a fuel-rich ratio during a lean burn operation of the internal combustion engine;
    limiting an execution time of the rich spike control; and
    performing a stoichiometric burn operation in which the engine air-fuel ratio is stoichiometric, after the limited execution time elapses.

13. A method according to claim 12, further comprising:
    providing a three-way catalyst in the exhaust passage.

14. A method according to claim 12, further comprising:
    switching to the stoichiometric burn operation when the limited execution time of the rich spike control elapses without recovering the NOx storing level.

15. A method according to claim 12, further comprising:
    switching from the stoichiometric burn operation to the lean burn operation after the NOx storing level is recovered.

16. A method according to claim 12, further comprising:
    performing the stoichiometric burn operation for a pre-set period of time; and
    switching to the lean burn operation after performing the stoichiometric burn operation.

17. A method according to claim 12, wherein the storage device is a NOx storage-reduction catalyst.

18. A method for controlling an emission of an internal combustion engine, comprising:
    providing a storage device in an exhaust passage of the internal combustion engine that stores a threshold level of NOx;
    reducing NOx stored in the storage device to recover a NOx storing level of the storage device by performing a rich spike control by temporarily shifting an engine air-fuel ratio to a fuel-rich ratio during a lean burn operation of the internal combustion engine;
    switching from the lean burn operation to a stoichiometric burn operation to reduce a partial amount of NOx stored in the storage device, and after performing the stoichiometric burn operation, when that the NOx storing level has not been recovered is determined; and
    performing the rich spike control within a pre-set period of time to reduce a remaining amount of NOx stored in the storage device.

19. A method according to claim 18, further comprising:
    providing a three-way catalyst in the exhaust passage.

20. A method according to claim 18, further comprising:
    starting the rich spike control from the stoichiometric burn operation, upon performing the stoichiometric burn operation for a pre-set period of time.

21. A method according to claim 18, further comprising:
    switching from the rich spike control to the lean burn operation after the NOx storing level is recovered.

22. A method according to claim 18, wherein the storage device is a NOx storage-reduction catalyst.

* * * * *